(12) United States Patent
Janecek

(10) Patent No.: US 8,168,915 B1
(45) Date of Patent: May 1, 2012

(54) CUTTING TORCH SPLATTER AND GLARE GUARD

(75) Inventor: Andrew Janecek, Wauwatosa, WI (US)

(73) Assignee: Messer Cutting Systems Inc., Menomonee Falls, WI (US)

( * ) Notice: Subject to any disclaimer, the term of this patent is extended or adjusted under 35 U.S.C. 154(b) by 467 days.

(21) Appl. No.: 12/428,233

(22) Filed: Apr. 22, 2009

Related U.S. Application Data

(60) Provisional application No. 61/047,032, filed on Apr. 22, 2008.

(51) Int. Cl.
*B23K 10/00* (2006.01)
(52) U.S. Cl. ......... 219/121.39; 219/121.44; 219/121.48; 219/121.5; 219/137.31
(58) Field of Classification Search ............. 219/121.39, 219/121.45, 121.54, 121.48, 121.5, 137.31, 219/137 R, 137.43
See application file for complete search history.

(56) References Cited

U.S. PATENT DOCUMENTS

| | | | |
|---|---|---|---|
| 4,063,059 A * | 12/1977 | Brolund et al. | 219/68 |
| 4,599,506 A * | 7/1986 | Burke et al. | 219/130.01 |
| 5,782,445 A | 7/1998 | Cleek | |
| 5,939,017 A | 8/1999 | Walcott | |
| 7,800,017 B2 * | 9/2010 | Zamuner | 219/137.2 |
| 2004/0104203 A1 * | 6/2004 | Yamaguchi et al. | 219/121.36 |
| 2007/0215587 A1 * | 9/2007 | Centner | 219/137.62 |

* cited by examiner

*Primary Examiner* — Mark Paschall
(74) *Attorney, Agent, or Firm* — Andrus, Sceales, Starke & Sawall, LLP

(57) ABSTRACT

A cutting torch splatter and glare guard includes a collar that is structured for releasable engagement with a cutting torch. The collar has first and second collar portions that are biased towards a first position for engagement with the cutting torch and movable against the bias towards a second position for disengagement with the cutting torch. A guard plate coupled to the collar and structured to block splatter and cutting debris emanating from a cutting surface. A plurality of shield plates is pivotably attached to the guard plate so as to pivot info and out of an orientation extending generally perpendicular downwardly relative to the guard plate.

7 Claims, 2 Drawing Sheets

CUTTING TORCH SPLATTER AND GLARE GUARD

CROSS-REFERENCE TO RELATED APPLICATION

This application relates to and claims priority of co-pending U.S. Provisional Patent Application No. 61/047,032, which is fully incorporated herein by reference.

BACKGROUND

The present application relates to plasma cutting systems such as those disclosed in U.S. Pat. Nos. 5,782,445 and 5,939,017, which are fully incorporated herein by reference.

SUMMARY

The present inventor has recognized that use of known plasma or oxyfuel cutting systems undesirably results in splatter and cutting debris emanating from the cutting surface and landing on the operator and valuable components of the machine. Another problem with such systems is that an intense glare is produced that can damage the operator's eyes.

This disclosure discloses a cutting torch splatter and glare guard that solves these problems by protecting an operator and surrounding equipment from damaging splatter and glare. The guard is configured for quick and easy attachment to and detachment from a cutting torch, such as plasma or oxyfuel cutting torches. The guard advantageously creates a secure barrier between the cutting surface and the operator/machine which knocks down splatter and blocks glare.

In one example, the guard includes a collar that is structured for releasable engagement with a cutting torch. The collar has first and second collar portions that are biased towards a first position for engagement with the cutting torch and movable against the bias towards a second position for disengagement from the cutting torch. A guard plate is coupled to the collar. A plurality of shield plates is pivotally attached to the guard plate so as to pivot into and out of an operable position, extending generally downwardly relative to the guard plate.

BRIEF DESCRIPTION OF THE DRAWINGS

The best mode of practicing the invention is described herein below with reference to the following drawing figures.

DETAILED DESCRIPTION OF THE DRAWINGS

Figure 2:
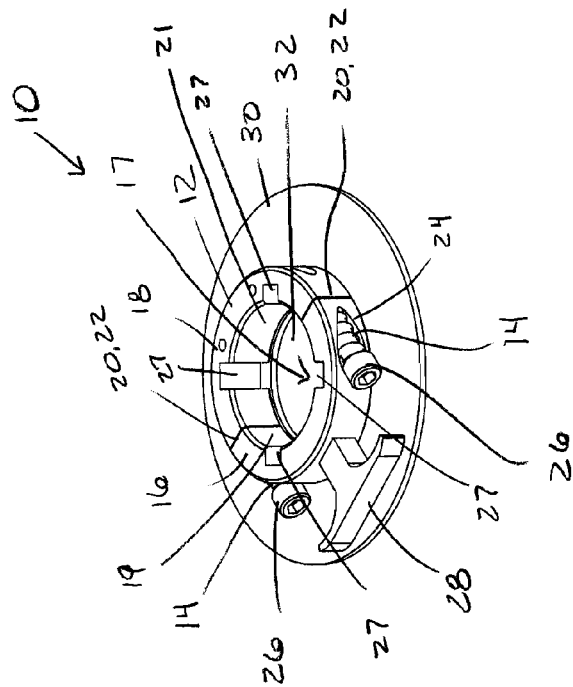
FIG. 2 is a perspective view of the example shown in FIG. 1.
Figure 1:
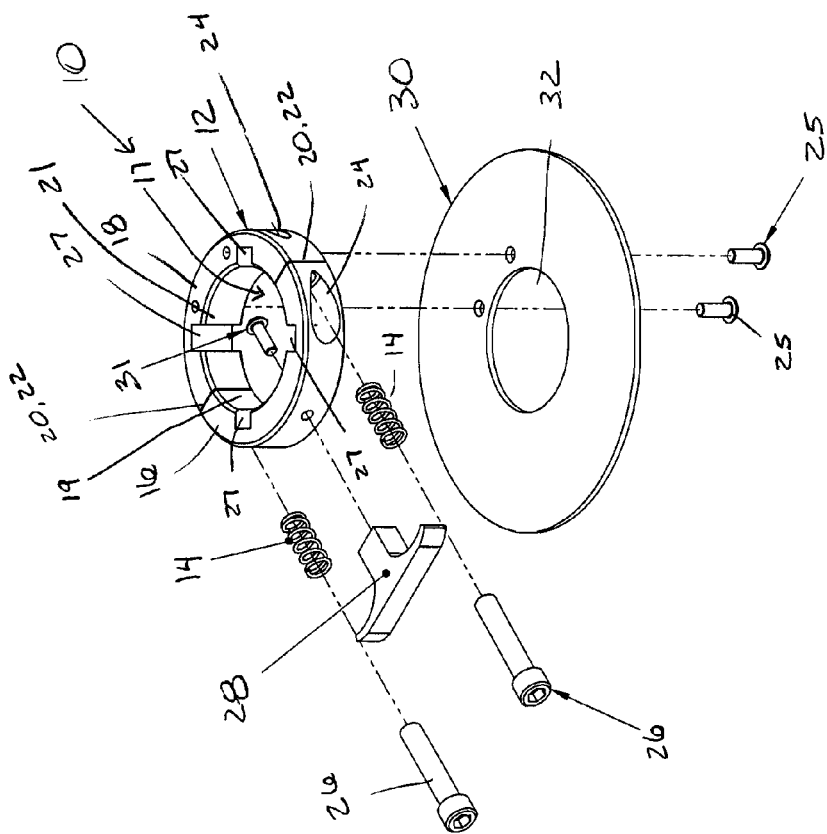
FIG. 1 is an exploded perspective view of a first example of a splatter and glare guard.

FIGS. 1 and 2 depict a cutting torch splatter and glare guard 10 having a shaft collar 12 that is structured to telescopically slide onto and releasably engage with an elongated cutting torch (not shown). The shaft collar 12 is spring-loaded to allow installation on the cutting torch without the use of tools. Specifically, the shaft collar 12 includes first and second halves or collar portions 16, 18 that mate together at adjacent mating surfaces 20, 22.

In the example shown, each collar portion 16, 18 is generally C-shaped. The collar portions 16, 18 together define a through-opening 17 for receiving the cutting torch and have inner engagement surfaces 19, 21 for frictionally engaging with an outer surface of the cutting torch when the collar portions 16, 18 are biased into the noted closed position. The end surfaces of each collar portion 16, 18 define the noted mating surfaces 20, 22.

A pair of open, horizontally-aligned channels 24 are formed in each of the first and second collar portions 16, 18. Springs 14 reside in the channels 24 formed in the first collar portion 16. Screws 26 extend through the springs 14 and through the channels 24 in the first collar portion 16, and matingly engage with an inner surface of the channels 24 in the second collar portion 18. Tightening the screws 26 pushes the springs 14 against an inner surface of channels 24 in the first collar portion 16 and thus the springs 14 resiliently bias the mating faces 20, 22 of the noted collar portions 16, 18 together. Loosening the screws 26 allows the springs 14 to expand away from the inner surface of the channels 24 in the first collar portion 16 and thus allows the mating faces 20, 22 of the noted collar portions 16, 18 to separate. The bias applied by the springs 14 is thus adjustable by tightening or loosening the screws 26. Specifically, tightening the screws 26 increases the bias force of the springs 14 on the collar portions 18, 20 and loosening the screws 26 decreases the bias force of the springs 14 on the collar portions 18, 20.

A handle 28 is attached to the first collar portion 16 by a screw 31. The first and second collar portions 16, 18 can be separated by grasping the handle 28 and pulling the first collar portion 16 away from the second collar portion 18, thus compressing the springs 14 against the first collar portion 16. When the handle 28 is released, the bias of the springs 14 pushes the collar portions 16, 18, including the noted mating surfaces 20, 22 and engagement surfaces 19, 21, towards each other.

A guard plate 30 having a hole 32 sized to receive a plasma or oxyfuel torch is fixedly attached to the bottom of a second collar portion 18 with screws 25. A plurality of recesses 27 are included in the engagement surfaces 19, 21 and define passageways through the collar 10, and specifically between the collar 10 and a cutting torch to which the collar 10 is mounted, for passage of control wires (not shown) related to the cutting torch. In one example, a gasket (not shown) is disposed between the collar 12 and guard plate 30 to inhibit the transfer of heat from the guard plate 30 to the shaft collar 12 and handle 28.

To engage the guard 10 with a cutting torch, the collar portions 16, 18 are biased together into a closed position (FIGS. 1 and 2) by springs 14. To disengage the guard 10 from the cutting torch, the collar portions 16, 18 are moved away from each other, against the bias of springs 14, into a second position (not shown), as further described below.

To attach the splatter and glare guard 10 to a cutting torch, a user grasps the handle 28 and pulls the first collar portion 16 apart from the second collar portion 18 towards the noted first position. This action separates the engagement surfaces 19, 21 apart a distance greater than the diameter of the cutting torch. The cutting torch is then inserted into the through-opening 17 and the hole 32 in the guard plate 30 until the guard plate 30 is located a preferred distance above a cutting head on the noted cutting torch, wherein the guard plate 30 is positioned to block splatter and glare emanating from the cutting head and cutting surface. The user then releases the handle 28 and the bias of springs 14 causes the first and second collar portions 16, 18 to move together and the engagement surfaces 19, 21 to clamp onto outer surfaces of the cutting torch.

The guard 10 is uniquely configured for use with cutting torches having various diameters. When the guard 10 is attached to a cutting torch having a relatively large diameter, a gap will remain between the mating surfaces 20, 22 when the engagement surfaces 19, 21 are clamped. When the guard 10 is attached to a cutting torch having a relatively small diameter, little or no gap will exist between the mating surfaces 20, 22 when the engagement surfaces 19, 21 are clamped.

To remove the splatter and glare guard 10 from the cutting torch, the above steps are taken in reverse. The user manually grasps the handle 28 and pulls the first collar portion 16 apart from the second collar portion 18 against the bias of springs 14 towards the noted first position. The cutting torch is then removed out of the opening 32 and through-opening 17. Thereafter the user releases the handle 28 and allows the springs 14 to bias the first and second collar portions 18, 20 back together into the noted second position.

Figure 4:
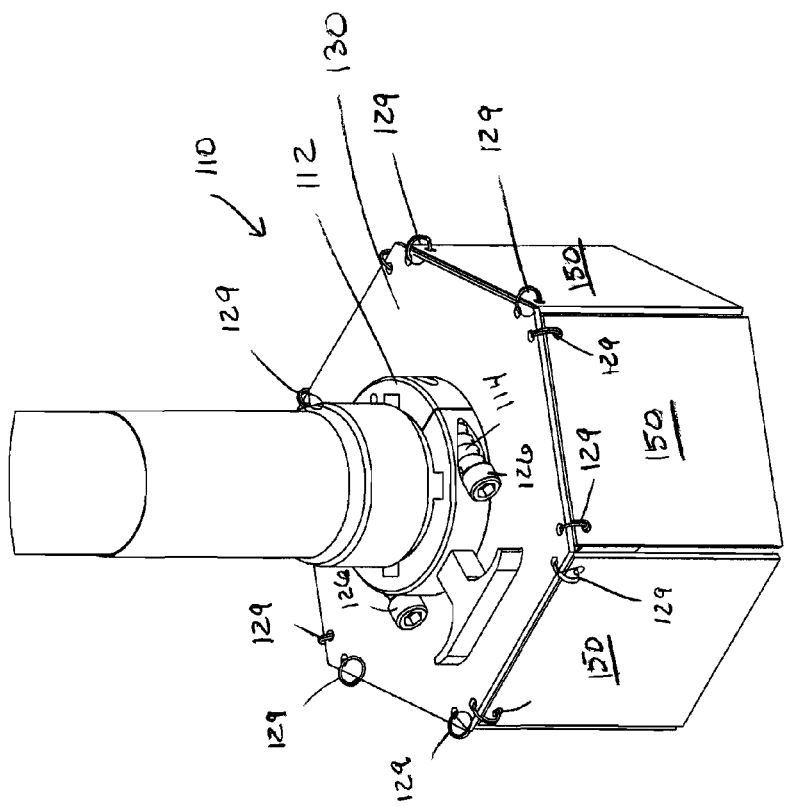
FIG. 4 is a perspective view of the example shown in FIG. 3.
Figure 3:
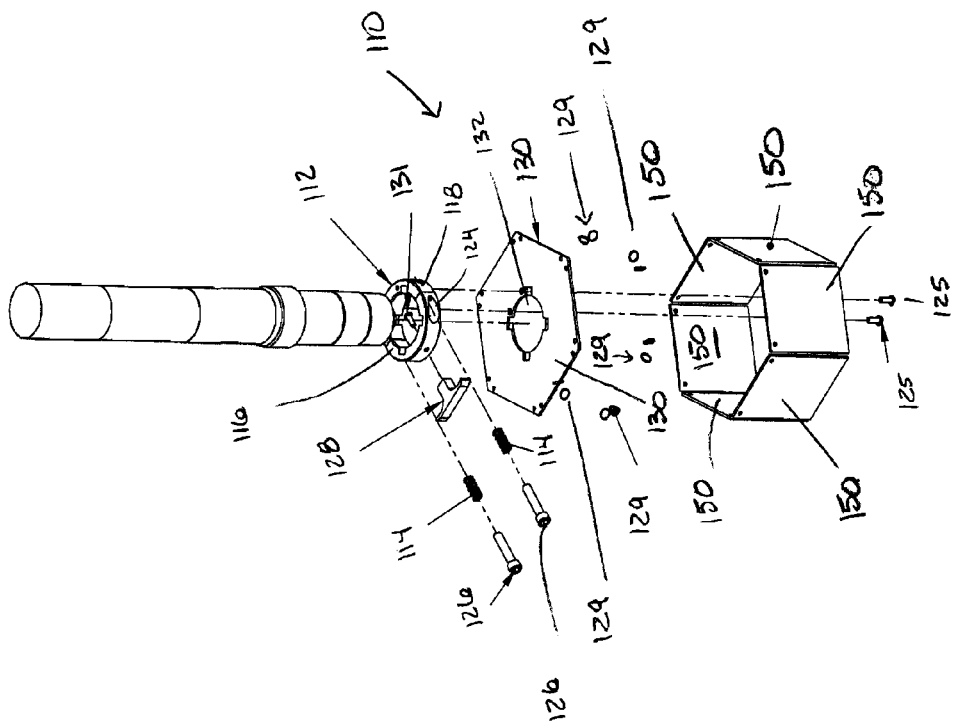
FIG. 3 is an exploded perspective view of a second example of the splatter and glare guard.

FIGS. 3 and 4 depict a splatter and glare guard 110 having shield plates 150 attached around the outside of the guard 110 to block glare. The guard 110 includes several structures that are similar in design and function to the guard 10 shown in FIGS. 1 and 2. These structures are referenced with like reference numbers in the 100-series. The shield plates 150 are pivotally attached to the guard plate 130 by hog rings 129 so that the shield plates 150 are free to swing back and forth. This allows the guard 110 to pass over "tipped up" parts or uneven surfaces during installation without getting hung up. The guard plate 130 is hexagonal to accommodate the six shield plates 150 aligned around its outer circumference. During operation the shield plates 150 are pivoted into an orientation extending generally perpendicularly downwardly relative to the guard plate 130 so as to block splatter and cutting debris emanating from a cutting surface.

The shaft collar 12, 112 and handle 28, 128 are preferably made of light weight, heat resistant, and low heat absorbing material. The guard plate 30, 130 is preferably made from light weight and heat resistant material such as brass which is also capable of inhibiting molten metal from sticking. In addition the guard plate can be separated from the shaft collar to which it is attached by an insulating gasket to inhibit the transfer of heat from the guard plate to the shaft collar and handle. In addition, the use of cooling air from above can be added if required to keep the parts cool during the operation of the torch.

The illustrated examples advantageously provide a single consolidated device that is easily installed with no tools required. Simply pulling the handle on the shaft collar compresses the springs and releases tension on the cutting torch to allow the guard to slide on or off. The swinging skirt/shield plates on the guard can cross over uneven surfaces without hanging up or snagging. The simple, small size of the device makes it flexible and able to be used on a variety of different cutting machines and on a multiple number of torches positioned close to one another, thus eliminating the need for complicated and bulky splatter guarding to protect hoses, cables, way surfaces, and sensitive electronics.

It should be noted that the invention described and depicted herein is susceptible to embodiments in many different forms. While this application contains drawings and description that refer to preferred examples, the application and drawings are not intended to limit the broad aspects of the invention.

What is claimed is:

1. A cutting torch splatter and glare guard comprising:
a collar that is structured for releasable engagement with a cutting torch, the collar having first and second collar portions that are biased towards a first position for engagement with the cutting torch and movable against the bias towards a second position for disengagement from the cutting torch; and
a guard plate coupled to the collar and structured to shield glare and block splatter and cutting debris emanating from a cutting surface;
wherein the first and second collar portions are biased towards each other into the first position;
wherein each of the first and second collar portions comprise an engagement surface structured to engage with an outer surface of the cutting torch when the collar portions are biased into the first position;
wherein the collar portions are biased into the first position by a spring;
wherein the bias applied by the spring is adjustable; and
a screw coupled to the first collar portion and compressing the spring against the second collar portion, wherein tightening the screw increases the bias force of the spring on the second collar portion and loosening the screw loosens the bias force of the spring on the second collar portion.

2. The guard according to claim 1, wherein the first and second collar portions comprise collar halves.

3. The guard according to claim 1, comprising a handle connected to the first collar portion and structured to allow for manually pulling of the first collar portion out of the first position.

4. The guard according to claim 1, wherein the guard plate is fixedly connected to the second collar portion.

5. A cutting torch splatter and glare guard comprising:
a collar that is structured for releasable engagement with a cutting torch, the collar having first and second collar portions that are biased towards a first position for engagement with the cutting torch and movable against the bias towards a second position for disengagement from the cutting torch; and
a guard plate coupled to the collar and structured to shield glare and block splatter and cutting debris emanating from a cutting surface;
a plurality of shield plates coupled to the guard plate;
wherein the plurality of shield plates are pivotably attached to the guard plate so as to pivot into and out of an orientation extending generally perpendicular to the guard plate wherein glare and block splatter and cutting debris emanating from a cutting surface is shielded.

6. A cutting torch splatter and glare guard comprising:
a collar that is structured for releasable engagement with a cutting torch, the collar having first and second collar portions that are biased towards a first position for engagement with the cutting torch and movable against the bias towards a second position for disengagement from the cutting torch; and
a guard plate coupled to the collar and structured to shield glare and block splatter and cutting debris emanating from a cutting surface;
wherein the first and second collar portions are biased towards each other into the first position;
wherein the plurality of shield plates are pivotably attached to the guard plate so as to pivot into and out of an orientation extending generally perpendicular to the guard plate so as to shield glare and block splatter and cutting debris emanating from a cutting surface.

7. A modular cutting system comprising:

a cutting torch;

a collar that is structured for releasable engagement with the cutting torch, the collar having first and second collar portions that are biased towards a first position for engagement with the cutting torch and movable against the bias towards a second position for disengagement from the cutting torch; and a guard plate coupled to the collar and structured to block splatter and cutting debris emanating from a cutting surface operated on by the cutting torch, wherein each of the first and second collar portions comprise an engagement surface structured to engage with an outer surface of the cutting torch when the collar portions are biased into the first position, wherein the collar portions are biased into the first position by a spring, wherein the bias applied by the spring is adjustable;

a plurality of shield plates coupled to the guard plate, wherein the plurality of shield plates are pivotably attached to the guard plate so as to pivot into and out of an orientation extending generally perpendicular to the guard plate wherein glare and block splatter and cutting debris emanating from a cutting surface is shielded; and a plurality of hog rings pivotably attaching the shield plates to the guard plate.

\* \* \* \* \*